United States Patent [19]

Cleereman et al.

[11] Patent Number: 5,174,627
[45] Date of Patent: Dec. 29, 1992

[54] VEHICLE STRUCTURE

[75] Inventors: Robert J. Cleereman, Midland, Mich.; Robert K. McIntyre, McMurray, Pa.; Steven C. Wasson, Midland, Mich.

[73] Assignee: The Dow Chemical Company, Midland, Mich.

[21] Appl. No.: 717,787

[22] Filed: Jun. 14, 1991

[51] Int. Cl.$^5$ ............................................. B62D 29/04
[52] U.S. Cl. ................................... 296/187; 296/901
[58] Field of Search ............... 296/187, 188, 185, 901, 296/186

[56] References Cited

U.S. PATENT DOCUMENTS

| | | | |
|---|---|---|---|
| D. 311,921 | 11/1990 | Popelier et al. | D15/15 |
| 4,342,470 | 8/1982 | Matsuda | 280/785 |
| 4,382,626 | 5/1983 | Spooner | 296/901 |
| 4,453,763 | 6/1984 | Richards | 296/185 |
| 4,709,958 | 12/1987 | Harrod | 296/901 |
| 4,955,664 | 9/1990 | Friedrich | 296/204 |
| 4,988,143 | 1/1991 | Harrod | 296/177 |
| 5,020,846 | 6/1991 | Bonnett | 296/186 |

OTHER PUBLICATIONS

Preliminary Feasibility Study-Provided by The Dow Chemical Company to Deere & Company as a private confidential communication on or about Sep. 1, 1989 (205 pages).
The Dow Chemical Company, "If Man Were Meant to Fly, God Would Have Given Him Wings", 12 pages, Apr. 1989 (U.S.A.).
Deere & Company, John Deere Riding Mowers, 8 pages, 1990 (U.S.A.).
Vicki P. McConnell, Advanced Composites, "In the Fast Track: Composites in Race Cars", 8 pages, Mar.-Apr. 1991 (U.S.A.).
Christopher A. Sawyer, "$63 Million Supercar", Automotive Industries Magazine, 3 pp., Mar. 1991 (U.S.A.).
Stuart Birch, "Global Viewpoints", Automotive Engineering Magazine, 2 pages, Jan. 1990 (U.S.A.).
Private correspondence from Eagle-Picher to Deer & Company in the U.S.A., 2 pages, drawings and a 3 page letter, dated Mar. 18, 1987.
Deere & Company, John Deere Telerobotics brochure, (4 pages of vehicle illustrations), published in U.S.A. prior to 1990.
General Electric Co., "Systems for Automated Manufacture", 8 pages, date unknown (U.S.A.).
Carron & Company, Inkster, Mich., "All Plastic Concept Car", 3 pages, Jul. 1987 (U.S.A.).
A. A. Adams of Lotus, "Reinforced Plastic Composites in the Specialized Automotive & Other Industries", 4 pages (3 pages dated Mar. 1987 and the last page being dated Mar. 1986).
Stratime Cappello Systems letter to Deere & Company dated 22 Nov. 1989 with attachment, 10 pages.
Robert J. Cleereman, "Effective Use of Polymers in Durable Goods", 22 pages, Mar. 7, 1988 (U.S.A.).
Ram Industries brochure, "Model Ram 80M", 2 pages, date unknown but thought to be prior to 1990.
Advanced Composites Magazine, "Speed Challenge by Composites Sports Car is No Bump Steer", 1 page Jan.-/Feb. 1991.

*Primary Examiner*—Robert R. Song

[57] ABSTRACT

A plastic monocoque body assembly comprised of three pieces bonded toegther is provided for a lawn and garden-type vehicle. The body assembly incorporates hollow compartments to provide the frame-like strength necessary to withstand concentrated torsional and bending loads. Compartments are provided in the sides, center and front portions of the assembly with each compartment including walls comprised of at lest two of the three pieces which form the assembly.

14 Claims, 5 Drawing Sheets

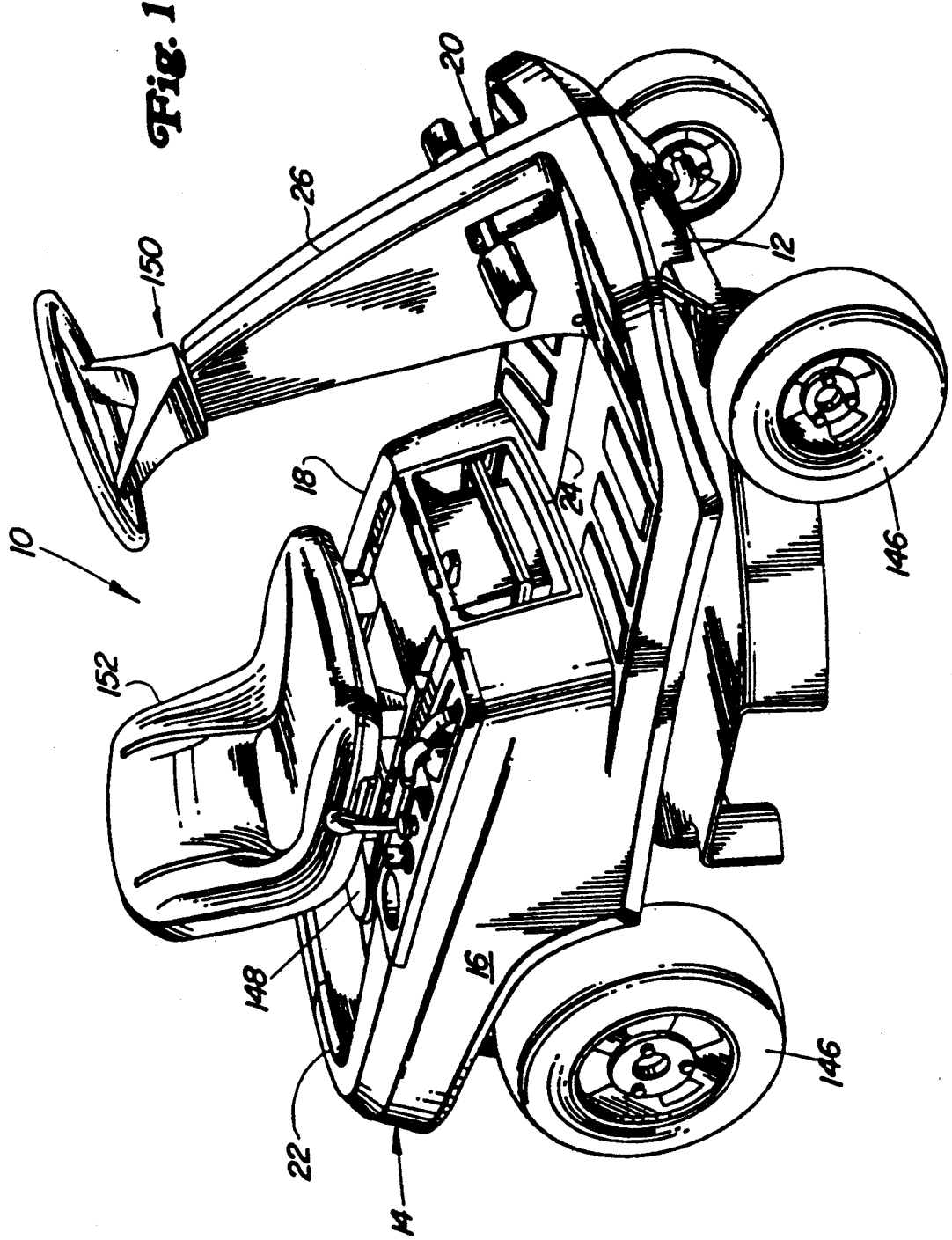

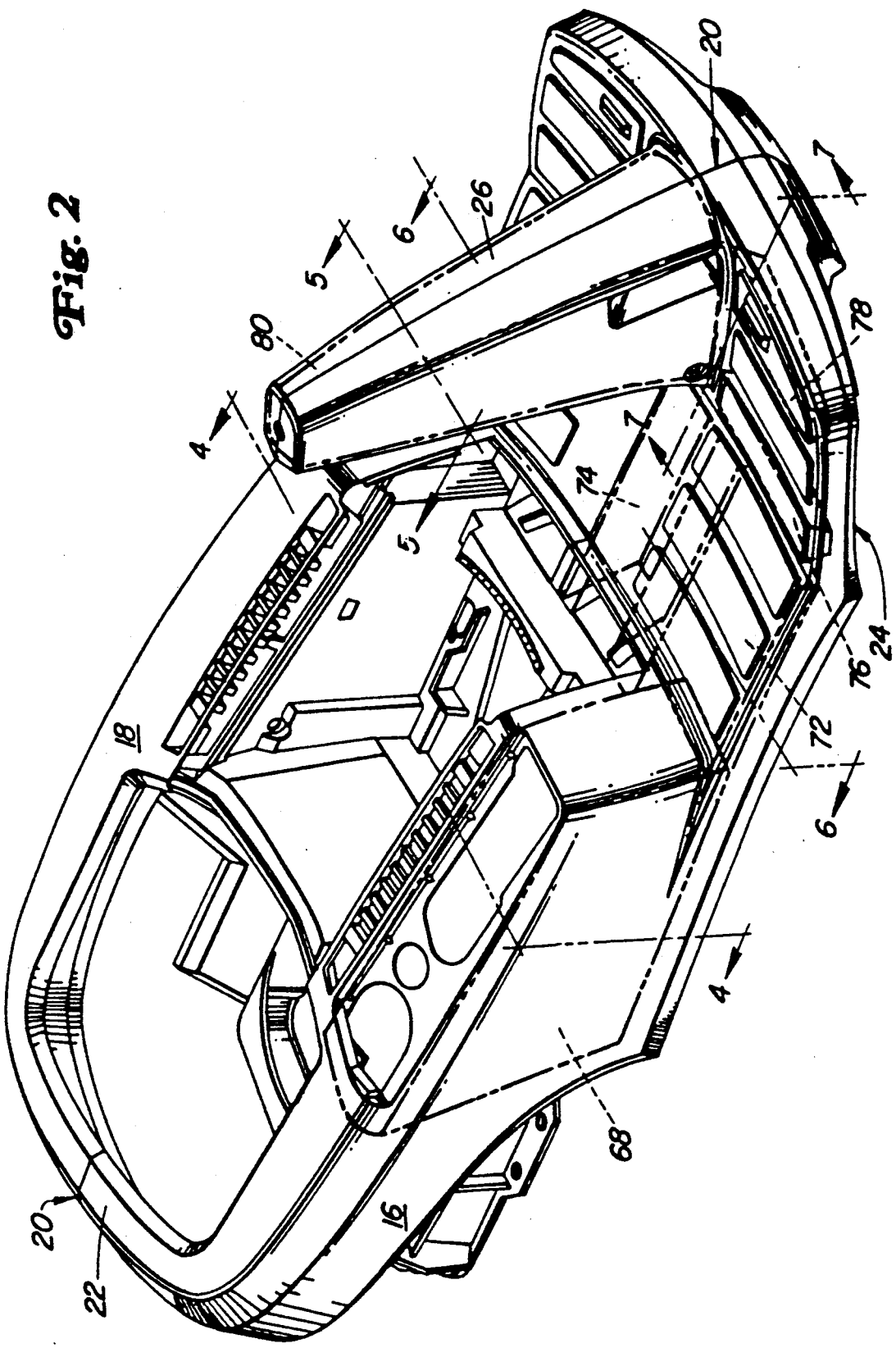

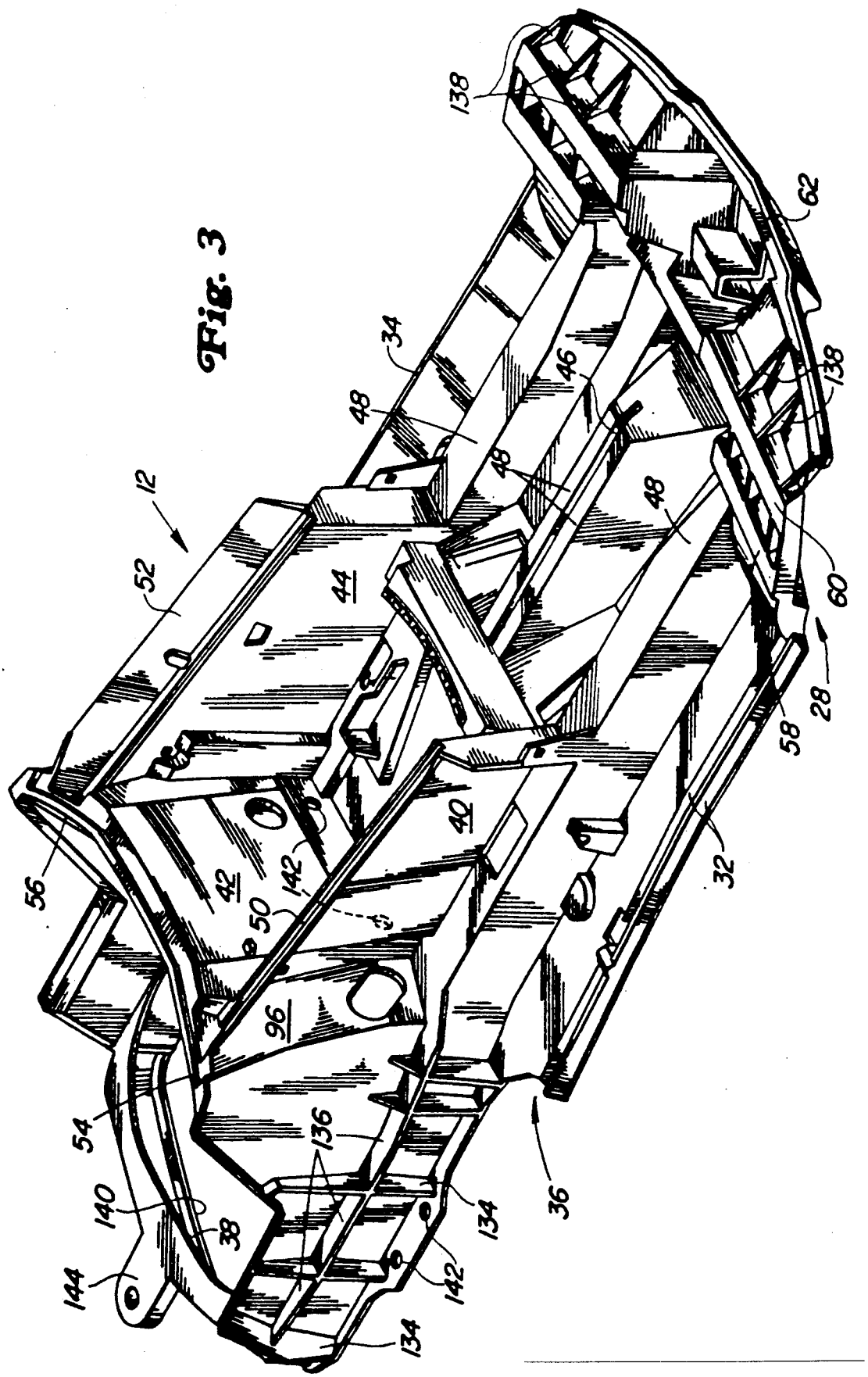

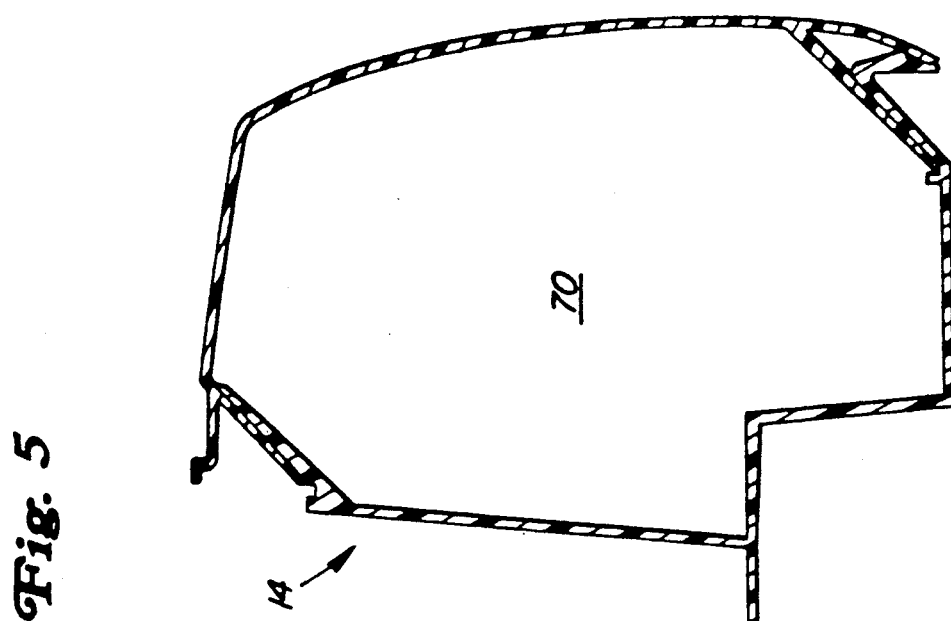
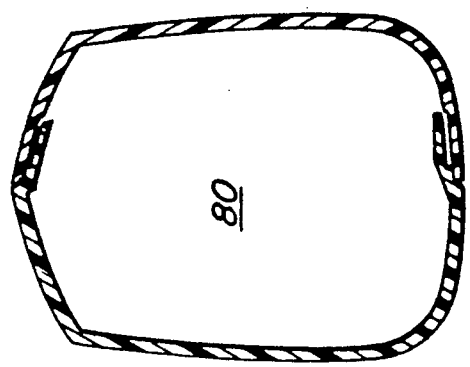
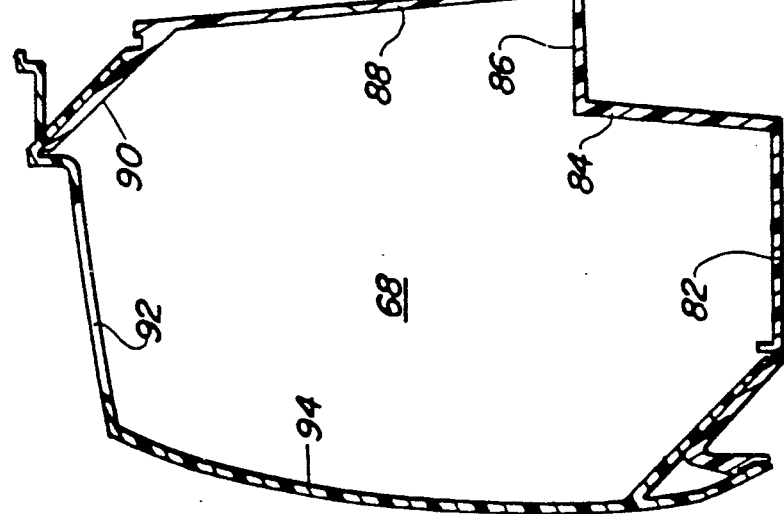

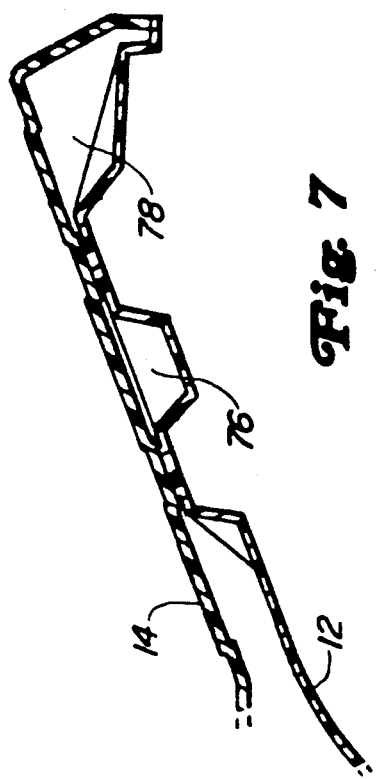
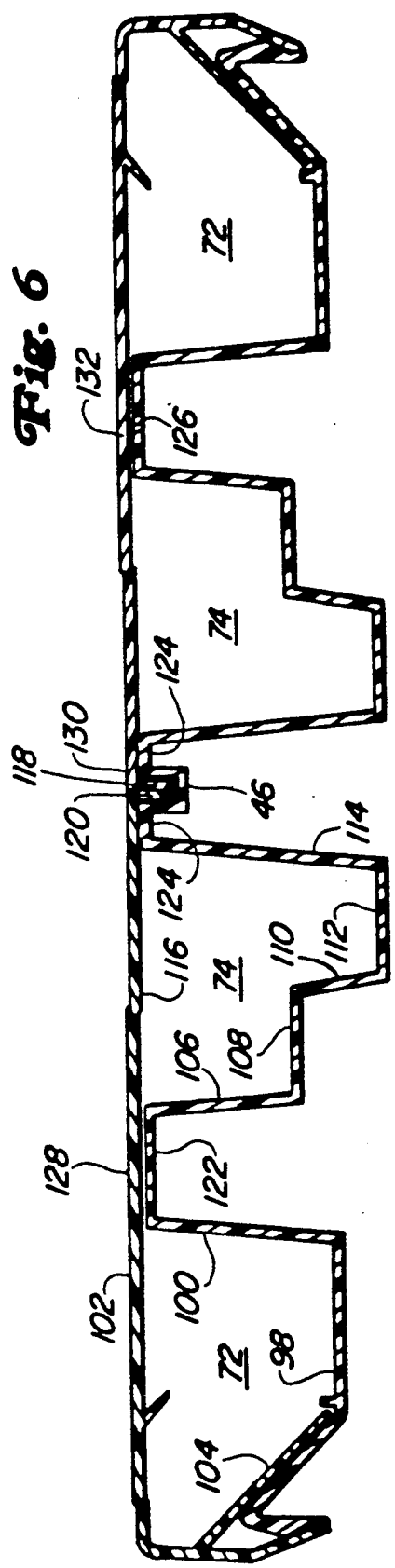

VEHICLE STRUCTURE

BACKGROUND OF THE INVENTION

1. Field of the Invention

The present invention relates to a structure for a vehicle, and more specifically to a three-piece monocoque body assembly for use in small vehicles, such as lawn and garden tractors.

2. Description of the Related Art

Today's lawn and garden ride-on vehicles utilize a frame that is typically manufactured from many individual pieces. Those pieces have traditionally been made of metal to withstand the various torsional and bending loadings encountered by the vehicle. Such pieces have been cut and/or stamped and then welded or bolted together. Subsequently, some type of enclosure is then attached to the main frame to cover the mechanical components, such as the engine, wheels, control linkages and battery.

The material, manufacturing and assembly costs for such similar frame and body structures are substantial and, therefore, it has been desirable to find alternative materials, manufacturing and assembly methods to reduce such costs.

Stressed skin body assemblies or monocoques, such as is the subject of the present invention, have been utilized for large and small vehicles and covered bridges. Some of these monocoque vehicle assemblies, as well as airplane structures, have frequently utilized stiffening elements, such as a metal skeleton to which fiber reinforced plastic panels are attached. Such structures, however, still require substantial assembly and manufacturing expenses.

SUMMARY OF THE INVENTION

It would therefor be desirable to provide a lawn and garden-type ride-on vehicle body and frame structure which is manufactured of as few a number of pieces as possible so as to reduce manufacturing and assembly costs.

Additionally, it would be desirable to provide such a vehicle structure which is produced from plastic-type materials and does not require a metal stiffening member.

Keeping these goals in mind, there is provided a monocoque plastic-type structure which performs the functions of both the traditional body and frame or chassis for a lawn and garden-type vehicle. The structure includes two similar thin-walled plastic halves which are joined together to form an upper body shell and a third or lower piece. The design is intended to take advantage of plastic material properties to integrate structural, appearance and functional features into the assembly and also reduce manufacturing and assembly costs.

In the preferred embodiment, the materials utilized for the body are plastic to provide a high gloss surface with molded-in color. The materials utilized for the lower member are fiber reinforced plastics to provide the high strength necessary to withstand operating loads and facilitate attachment of the engine, transaxle, pulleys, and other vehicle components.

In addition to their structural performance, the upper and lower body members have some specific and separate functional requirements, therefore different materials may be used. For the upper body, a material that would be suitable for aesthetic surfaces with molded-in color would be The Dow Chemical Co.'s engineering thermoplastic known by the trademark SABRE™. For the lower frame member, one suitable material would be The Dow Chemical Co.'s engineering thermoplastic polyurethane known by the trademark ISOPLAST™.

Together the cross sectional upper and lower members provide a monocoque vehicle structure which includes closed box sections within the sides, center and front of the vehicle to withstand torsional, bending and other loads.

Through providing built-in box-like geometric sections between the upper and lower members, the thin-walled plastic upper and lower members provide the vehicle with the frame-like stiffness or rigidity necessary to withstand global, torsional and bending loads (as contrasted with localized or concentrated loads). There is, therefore, eliminated the need to build a metal frame structure from several stamped and/or cut parts which must be welded and/or bolted together and then painted.

BRIEF DESCRIPTION OF THE DRAWINGS

FIG. 1 is a front elevational perspective view of the vehicle structure as used on a completed lawn and garden tractor.

FIG. 2 illustrates the monocoque body assembly, the two upper body halves assembled to the lower member and the closed section forms for one side of the assembly designated by heavier phantom lines.

FIG. 3 illustrates the lower member of the assembly.

FIG. 4 is a view taken along lines 4—4 of FIG. 2 and illustrates the laterally spaced box-like enclosures on each side of the operator's seating area.

FIG. 5 is a view taken along lines 5—5 of FIG. 2 and illustrates the hollow steering column enclosure formed by the left and right body halves.

FIG. 6 is a view taken along lines 6—6 of FIG. 2 and illustrates the hollow enclosures formed in the center forward portion of the assembly.

FIG. 7 is a view taken along lines 7—7 of FIG. 1 and illustrates the forwardly located and laterally extending closed-box structures formed between the upper and lower members.

DESCRIPTION OF THE PREFERRED EMBODIMENT

Looking first to FIG. 1, there is illustrated a front elevated perspective view of the assembled vehicle 10, including the lower member 12 and upper body member 14. As best illustrated in FIG. 2, the upper body member 14 is formed of two injection molded halves designated 16 and 18. The halves 16 and 18 are joined together along a fore-and-aft extending seam 20 to join the rear portion 22, the forward footrest area 24 and steering column portion 26.

The upper body member 14, once assembled from the two halves 16 and 18, is permanently joined to the lower member 12, which is best illustrated in FIG. 3. In the preferred embodiment for the vehicle lower member 12 and upper body member 14, plastic materials are utilized for forming the two halves 16 and 18 and adhesive is used to join the upper body member 14 to the lower member 12 along bond joint surfaces. The specific method of assembly and joining the lower member 12 and upper body member 14 is the subject of a related patent application, Ser. No. 07/715,204, filed Jun. 14, 1991.

Looking now to the lower member 12 illustrated in FIG. 3, it will be noted that it includes a generally horizontal forward end portion 28 that receives the foot rest portion 24 of the upper body member 14, side rail portions 32 and 34, adjacent the forward end portion 28, a center portion 36, and a rear portion 38 which may accommodate a power means and drive system.

In the center portion 36 of the lower member 12, there are upstanding walls 40, 42 and 44 forming an area adapted to receive an adjustable seat structure upon which an operator can sit. Correspondingly, the feet of the operator would be positioned on the flattened area 24 of the upper body member 14 just in the front of the seating area. Looking back to FIG. 1, there is noted an upstanding column 26 is provided in the forward portion of the upper body member 14 for receiving a steering mechanism to control the direction of the vehicle 10.

The thin-walled member 14 in the preferred embodiment is produced with a plastic material, such as SABRE ™ engineering thermoplastic, which is designed to utilize molded-in color and also provide a smooth and pleasing aesthetic surface. The lower member 12 is similarly formed of a thin wall structure and preferably of fiber reinforced plastic, one suitable material being ISOPLAST ™ engineering thermoplastic.

As illustrated in FIG. 3, the lower member 12 is adapted to be permanently joined within the upper body 14 along several surfaces. Those surfaces include left and right side rail surfaces 32 and 34, center channel 46, center fore-and-aft surfaces 48, left and right top surfaces 50 and 52, left and right rear surfaces 54 and 56, and laterally extending forward surfaces 58, 60 and 62.

The thin-walled lower member 12 when assembled with the thin-walled upper body member 14 form several closed sections which provide the structural stiffness or rigidity and integrity for the assembled lower and upper members 12 and 14 to withstand various types of torsional, bending and other loads encountered during its operation (see FIG. 2). For purposes of this application, thin-walled is intended to include materials which have a cross sectional thickness that permits them to be somewhat flexible. For example, the plastic upper body member 14 in the preferred embodiment would have a thickness of approximately 4 mm while the lower member would have a nominal thickness of 4 mm (varying from approximately 3½ to 7 mm).

With the use of thin-walled structures and closed box sections, the monocoque assembly is able to utilize plastic materials having a modulus of elasticity of less than 5,000,000 psi, substantially lower than those moduli of metals like aluminum and steel.

While the particular modulus of elasticity utilized in the upper body member material of the illustrated embodiment is less than 500,000 psi and that utilized in the lower member material is less than 1,500,000 psi, it is believed that the invention is preferably practiced with materials having moduli under 2,000,000 psi and can be realized with upper and lower member materials having modulus of elasticity under 5,000,000 psi.

Since the geometric forms are essentially identical in each left and right half of the assembled body, only those forms on the right side are illustrated in FIG. 2 and discussed in detail. The enclosures in the preferred embodiment are box-like in form and include one placed to each side of the operator station, those being designated 68 and 70 (see FIGS. 2 and 4). Additional closed sections 72 and 74 are contained in the outside center and right forward portion of the assembled structure, those being best illustrated in FIGS. 2 and 6. Further enclosures 76 and 78 formed by the upper and lower members 14 and 12 include those in the footrest area which extend laterally, these being best illustrated in FIGS. 2 and 7. One further enclosure 80 is formed between the two upper body halves 16 and 18 within the steering column 26. Its cross-section is illustrated in FIG. 5.

Returning now to FIG. 4 and a discussion of the enclosures designated 68 and 70. These box-like enclosures 68 and 70 are provided to each side of the operator's seating position and are comprised, in the preferred embodiment, of walls 82, 84, 86, 88 and 90 provided by the lower member 12, the other two walls 92 and 94 being provided by the upper member 14. Forming a portion of the rear surface for the box-like enclosure would be the vertical surface 96 (see FIG. 3).

Turning now to FIG. 6 which illustrates the enclosures 72 and 74 contained in the central portion of the vehicle assembly, there are found four enclosures, including left and right outside enclosures 72 and left and right inside enclosures 74. The outside enclosures 72 are formed through joining walls 98 and 100 of the lower member 12 to walls 102 and 104 of the upper body structure 14. The wall designated 104 includes a lower member guide and body follower surface, which together comprise the wall 104.

The inside enclosures 74 are each comprised of six walls 106, 108, 110, 112 and 114 formed in the lower member 12 joined to an upper wall surface 116 of the upper body member 14. Also illustrated in FIG. 5 is the center joint wherein downturned legs 118 and 120 are received in the U-shaped channel 46 for securing the upper body member 14 to the lower member 12. Adhesive would additionally be applied to join the surfaces 122, 124 and 126 to the respective surfaces 128, 130 and 132.

Looking again to FIG. 3, it is noted that the lower member 12 includes vertical and horizontal reinforcing ribs along the rear portion thereof, designated 134 and 136. Additional vertical reinforcing ribs are provided at the forward end of the member 12 and these are designated 138. In the rear portion of the member 12, there is formed an opening 140 adapted to carry an engine and transaxle module, bolted thereto through the holes 142. At the rear of this enclosure 140 is additionally formed a tow bar 144 for attaching trailering-type devices commonly used with small lawn and garden-type tractors.

Returning now to FIG. 1, the vehicle assembly is shown equipped with wheels 146, an engine 148, steering mechanism 150, and operator's seat 152. Accordingly, the vehicle 10 would experience various types of loads and deflections during operation. The loads which would typically be carried and resisted by a metal frame structure are carried and resisted by the box-like enclosures 68, 70, 72, 74, 76, 78 and 80 formed between the upper body member 14 and the lower member 12. The enclosures 68, 70, 72, 74, 76, 78 and 80 permit the use of thin-walled plastic to accommodate such loads and deflections. The enclosures or geometric forms incorporated into the monocoque assembly are designed to provide the rigidity in the body structure to resist such loads and also serve various other functions necessary in such a vehicle body, including providing the footrest area, seating area, control console housing, engine mounting area, steering column, brake and clutch housings, and so forth.

While various geometric forms and shapes may be utilized to provide the structural integrity necessary to resist such loads and deflections, in the preferred form open-ended compartments, as illustrated with elongated shapes, are believed to be satisfactory.

From the foregoing, it is apparent that a thin-walled material can be utilized to form a minimum number of parts which can be joined together to comprise a vehicle structure, with the capability of resisting various loads and deflections the body structure would be expected to encounter. Accordingly, the expense of providing a metal-type frame structure with all of the various parts that are stamped, cut, welded and painted and an upper body structure that would be joined thereto is avoided.

We claim:

1. A monocoque vehicle assembly comprised of a thin-walled, plastic upper member joined to a thin-walled, plastic lower member, said assembly including at least three multi-sided closed sectioned compartments formed by and between said members for improving structural stiffness or rigidity of the assembly as it encounters torsional and bending loads, the first and second enclosures being provided to each transverse side of a centrally positioned operator station, and the third enclosure provided in the center portion of said vehicle vertically below the operator station.

2. The invention defined in claim 1 wherein the lower member is composed of fiber reinforced plastic.

3. The invention defined in claim 1 wherein the modulus of elasticity of the upper member is less than 500,000 psi.

4. The invention defined in claim 1 wherein the modulus of elasticity of the lower member is less than 1,500,000 psi.

5. The invention defined in claim 1 wherein the respective moduli of elasticity of the upper and lower members are under 5,000,000 psi.

6. The invention defined in claim 2 wherein the vehicle is a lawn and garden-type vehicle.

7. The invention defined in claim 2 wherein the upper member includes molded-in color and a hi-gloss surface.

8. The invention defined in claim 2 wherein the first and second compartments each include at least four sides, two sides being comprised by portions of the upper member and two sides being comprised by portions of the lower member.

9. The invention defined in claim 2 wherein there is further provided at least four side-by-side compartments located forwardly of the operator's station.

10. The invention defined in claim 2 wherein the assembly includes an upstanding steering column which also includes an elongated closed section compartment therein.

11. The invention defined in claim 2 wherein there is further provided a plurality of transversely extending compartments located forward of the operator station.

12. A ride-on vehicle having thin-walled plastic upper and lower members joined together in a monocoque assembly, said assembly including first and second portions adapted to support respectively the torso and feet of an operator, the upper member including at least first and second pairs of laterally and downwardly extending structure which are joined with at least first and second pairs of lateral and upwardly extending member structures to form first and second closed section compartments for resisting torsional and bending loads encountered by the assembly.

13. A monocoque vehicle assembly including an upper member fixed to a lower member, said members being made from plastic material and forming central and forward vehicle portions, the central portion adapted to receive the torso of an operator and the forward portion adapted to receive the feet of said operator, the upper and lower members further forming between them at least three hollow compartments adapted to resist torsional and bending loads encountered by the vehicle, two of said compartments being located on the lateral sides of the central portion of the assembly and one compartment being located within the forward portion of the assembly.

14. The invention defined in claim 2 wherein the lower member also includes molded-in color.

* * * * *